United States Patent [19]
Pearson

[11] Patent Number: 6,032,152
[45] Date of Patent: Feb. 29, 2000

[54] OBJECT FACTORY TEMPLATE

[75] Inventor: Chris C. Pearson, Lake Oswego, Oreg.

[73] Assignee: Intel Corporation, Santa Clara, Calif.

[21] Appl. No.: 09/002,233

[22] Filed: Dec. 31, 1997

[51] Int. Cl.[7] .................................................. G06F 17/30
[52] U.S. Cl. ......................... 707/103; 395/685; 395/702
[58] Field of Search .................. 707/1, 5, 10, 100–104, 707/200–206; 395/200.31, 683, 685, 701, 702, 707, 708, 705; 709/102, 202, 303; 714/25, 46

[56] References Cited

U.S. PATENT DOCUMENTS

| | | | |
|---|---|---|---|
| 5,493,680 | 2/1996 | Danforth | 395/702 |
| 5,692,195 | 11/1997 | Conner | 395/685 |
| 5,768,505 | 6/1998 | Gilchrist et al. | 395/200.31 |
| 5,822,580 | 10/1998 | Leung | 707/103 |
| 5,878,432 | 3/1999 | Misheski et al. | 707/103 |
| 5,893,106 | 4/1999 | Brobst et al. | 707/102 |

OTHER PUBLICATIONS

M.A. Ellis & B. Stroustrup, "Classes", The Annotated C++ Reference Manual, AT&T Bel Telephone Laboratories, Inc., 1990, pp. 163–193.

M.A. Ellis & B. Stroustrup, "Special Member Functions", The Annotated C++ Reference Manual, AT&T Bell Telephone Laboratories, Inc., 1990, pp. 261–306.

M.A. Ellis & B. Stroustrup, "Templates", The Annotated C++ Reference Manual, AT&T Bell Telephone Laboratories, Inc., 1990, pp. 341–351.

"The Standard C++ Library and Tools.h++", Rogue Wave Software, Inc., 1995–9, 22 pages, downloaded from ww.roguewave.com, Jul. 9, 1999.

"COM: Delivering on the Promises of Component Technology", Microsoft Corporation, 1999, 9 pages, downloaded from www.microsoft.com, Jul. 9, 1999.

"The Component Object Model: A Technical Overview", Microsoft Corporation, 1999, 17 pages, downloaded from www.microsoft.com, Jul. 9, 1999.

"Latest Platform, Internet, and Component Support", Microsoft Corporation, 1999, 5 pages, downloaded from www.microsoft.com, Jul. 9, 1999.

"TN001: Window Class Registration", Microsoft Corporation, 1999, 3 pages, downloaded from www.microsoft.com, Jul. 9, 1999.

"TN002: Persistent Object Data Format", Microsoft Corporation, 1999, 3 pages, downloaded from www.microsoft.com, Jul. 9, 1999.

"TN004: C++ Template Tool", Microsoft Corporation, 1999, 1 page, downloaded from www.microsoft.com, Jul. 9, 1999.

"TN006: Message Maps", Microsoft Corporation, 1999, 5 pages, downloaded from www.microsoft.com, Jul. 9, 1999.

"TN024: MFC–Defined Messages and Resources", Microsoft Corporation, 1999, 5 pages, downloaded from www.microsoft.com, Jul. 9, 1999.

"TN033: DLL Version of MFC", Microsoft Corporation, 1999, 13 pages, downloaded from www.microsoft.com, Jul. 9, 1999.

"TN038: MFC/OLE Iunknown Implementation", Microsoft Corporation, 1999, 12 pages, downloaded from www.microsoft.com, Jul. 9, 1999.

"TN039: MFC/OLE Automation Implementation", Microsoft Corporation, 1999, 5 pages, downloaded from www.microsoft.com, Jul. 9, 1999.

*Primary Examiner*—Ruay Lian Ho
*Attorney, Agent, or Firm*—Blakely, Sokoloff, Taylor & Zafman LLP

[57] ABSTRACT

A method is provided for dynamically constructing an object. According to one embodiment, process includes providing a utility constructor class parameterized on a subject class type; providing an object constructor class for a subject class; providing a default constructor method in the constructor class for constructing an object of the subject class; and using the default constructor method to construct an object of the subject class.

15 Claims, 5 Drawing Sheets

OBJECT FACTORY TEMPLATE

BACKGROUND OF THE INVENTION

1. Field of the Invention

This invention relates generally to object oriented programming and, more particularly, to the dynamic construction of objects of arbitrary class at run time.

2. Description of the Related Art

Three key concepts define object oriented technology in programming: (1) "objects" that encapsulate procedures and data; (2) "messages" that support polymorphism across objects; and (3) "classes" that implement inheritance within class hierarchies. These concepts are well known in the art and are described in many books, such as Object Technology—A Manager's Guide (Second Edition) by David A. Taylor, Ph.D. (First Printing September, 1997).

More particularly, an object is a software element that combines data and related procedures that manipulate that data. Packaging the data and related procedures together is known as encapsulation. The procedures are referred to as "methods" to distinguish them from conventional procedures that are not attached to objects. The data elements are referred to as variables.

FIGS. 1 and 2 represent a generic object and an example of an object that represents a vehicle, such as a truck (with its associated methods and variables). Objects interact with one another by sending messages asking objects to carry out their methods. A message is simply the name of an object followed by the name of a method the object knows how to execute. If a method requires any additional information to know precisely what to do, the message includes that information as a collection of data elements called "parameters." For example, with respect to FIG. 2, a message to the truck object to move to point A would read: Truck (Move to (A)).

The ability of different objects, really different types of objects, to respond to the same message in different ways is called "polymorphism." For example, ship objects, car objects, and plane objects all may implement the method "MoveTo", but each of these three types of objects would implement the method in a different way.

A class is a software template that defines the methods and variables to be included in each instance of an object that is created from the class using its software template. The class specifies a data structure and the permissible methods that apply to each of the objects created from the template. Typically, the data structure comprises numerous pointers that represent a physical address for the location of data, the actual data itself, or both, as shown in FIG. 3. Each class is often uniquely identified by a data value known as a class identifier. An object, then, is an instance of a particular class.

The methods and variables that make up an object are defined only once, in the definition of the class. In any particular application there may be many objects of a certain class. The objects that belong to a class contain only their own particular values for the variables, but all objects of a particular class contain the same methods.

It is possible for one class of objects to be defined as a special case of a more general class. This mechanism or technique is known as "inheritance."

Because an object is made up of methods, data, and pointers, the object as a whole is often not stored in contiguous memory as is shown in FIG. 3. But to facilitate interprocess communication, i.e., transmission between address spaces, or persistence, i.e., storage on non-volatile media, an object is often serialized, or stored in contiguous memory as shown in FIG. 4. Inter-process communication and object persistence are fundamental techniques used in many software applications. After an object has been serialized it is often deserialized, e.g., after the inter-process communication or after retrieval from non-volatile media. Object deserialization is the reconstitution of an object that has been serialized. That is, the object is filled with data, the pointers in the object are set to the address of the data, and the methods of the object are associated with the object.

The first step in object deserialization is to construct an object of arbitrary class. It is desirable for an application, or process, to be able to construct an object of an arbitrary class. This is because an application, or process, during the time that it is executing, may have to interact with an object of a class that was not specified to the application at the time the application was compiled. For example, in FIG. 5 there are shown two computer systems 100 and 200. The computer system 100 has classes 101, 102, and 103 and corresponding objects 1011 and 1021, and 1031. The computer system 200 has classes 201, 202, and 203 together with corresponding objects 2011, 2021, and 2031. During its operation, the computer system 200 communicates the object 2011 to the computer system 100, which is running an application 110. Because the application 110 was compiled only with the classes 101, 102, and 103, the application 110 must construct an object of the class 201 to interact with object 2011. The construction of an object of a class not specified at compile time is referred to as dynamic object construction (as compared to virtual object construction, which is the creation of a new object of the same class as another pre-existing object). The object that is constructed by dynamic object construction is referred to as a subject class.

There currently exist various processes and software packages to perform a limited form of dynamic object construction. One of these is the Microsoft Component Object Model ("COM") architecture. Instead of providing a substantially generic dynamic object construction methodology, however, COM requires that each subject class implement what is known as the IUnknown interface. This so-called interface, IUnknown, is essentially a set of three processes, one of which is a process of invoking an actual interface. In other words, the IUnknown interface really is not an interface. It is the "actual" interface that allows the subject class, and each object instance of that class, to be called on by other objects or applications. Because each subject class in the COM architecture must implement the non-standard IUnknown interface, as well as at least one other predefined interface (the actual interface), the COM architecture is not truly generic.

In addition to the foregoing limitation, COM requires each class be assigned a 128-bit class identifier or globally unique identifier ("GUID"). Once again, by requiring a GUID of a specific size, and of a substantially large size, COM places additional limitations on dynamic object construction making COM less generic.

Not only must each class have a 128-bit GUID in COM, but each class identifier, or GUID, must be registered in the system registry, i.e., a persistent centralized database. Moreover, there must be one and only one program to export an entry-point (this program is known as the IClassFactory interface) to construct objects of the subject class. That is, there must be one and only one program that creates instances of objects of a subject class. In other words, in COM, there must exist only one IClassFactory for each subject class.

Yet another limitation is that the COM interfaces that specify the serialization architecture (known as IPersist*) also imply that the serial representation of objects must contain the 128-bit GUID class identifier, which can add unnecessarily to the size of the protocol data units transmitted by the network. Also, requiring class identifiers to appear in the system registry creates install-time complications, makes it difficult for multiple program versions to co-exist, and can reveal proprietary implementation details to reverse engineers.

The Microsoft Foundation Classes ("MFC") software developers kit provides a technique for dynamic object construction. This technique is inseparably bound with MFC object persistence. Object persistence refers to the concept of maintaining objects over time and reusing them whenever a program is run. For each subject class, MFC object persistence requires that the subject class derive from a common base class known as CObject. In addition, the subject class must implement at least one member function or method (known as GetRuntimeClass). Finally, the subject class must be serialized and deserialized via a proprietary CArchive object. In addition to these limitations, MFC object persistence requires that the name string of the subject class be used as the class identifier. And MFC supports only a single global class information database. Moreover, MFC doesn't give the programmer access to the class information database. Finally, because MFC is an application level class library, its sheer size militates against its use by system software components.

Still another application that provides limited dynamic object construction capability is the C++ class library known as Rogue Wave Tools.H++. This product provides dynamic object construction through its RWFactory class. But in similar fashion to COM and MFC, Rogue Wave fools.H++ is organized such that for each subject class, RWFactory requires that the subject class derive from a common base class known as RWCollectable. In addition, the subject class may only be identified by a 16-bit unsigned integer. And the subject class must implement five specific methods. Finally, the subject class must be registered with a single global factory object.

All three of these alternatives require that subject classes derive from a common base class, or that the subject classes implement specific non-standard methods, with the consequences that they can not be used with pre-existing class hierarchies that don't comply with these requirements and intrude unacceptably into the design of subject class hierarchies.

The present invention is directed to overcoming, or at least reducing the effects of one or more of the problems set forth above.

SUMMARY OF THE INVENTION

The invention, in one embodiment, is a process for dynamically constructing an object. The process includes providing a utility constructor class parameterized on a subject class type; providing an object constructor class for a subject class; providing a default constructor method in said constructor class for constructing an object of said subject class; and using said default constructor method to construct an object of said subject class.

BRIEF DESCRIPTION OF THE DRAWINGS

Other advantages of the invention will become apparent upon reading the following detailed description and upon reference to the drawings in which.

Figure 1:
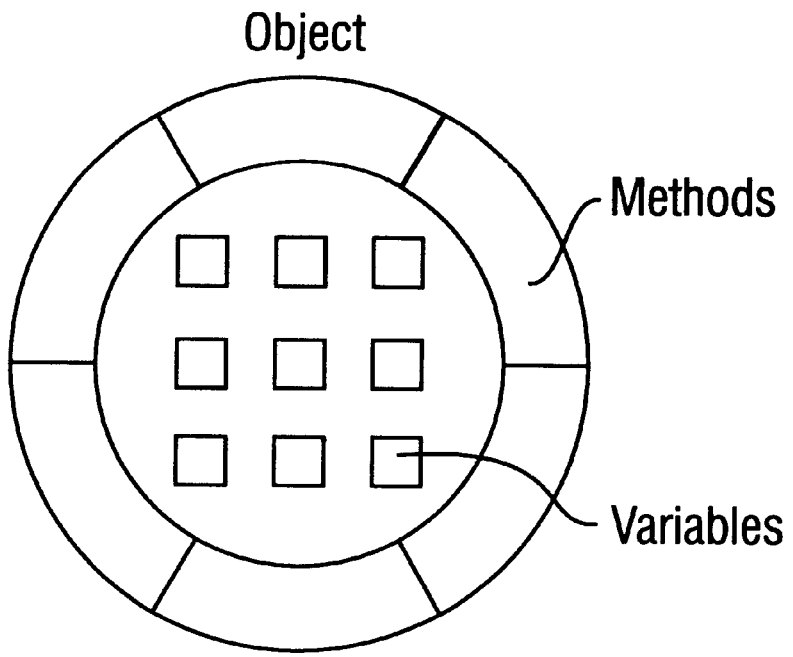
FIG. 1 is a generic representation of an object.
Figure 2:
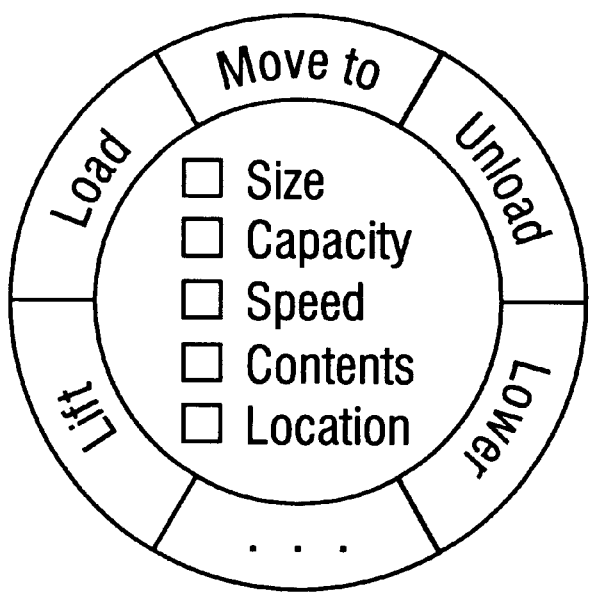
FIG. 2 is an exemplary representation of an object with particular methods and variables.
Figure 3:
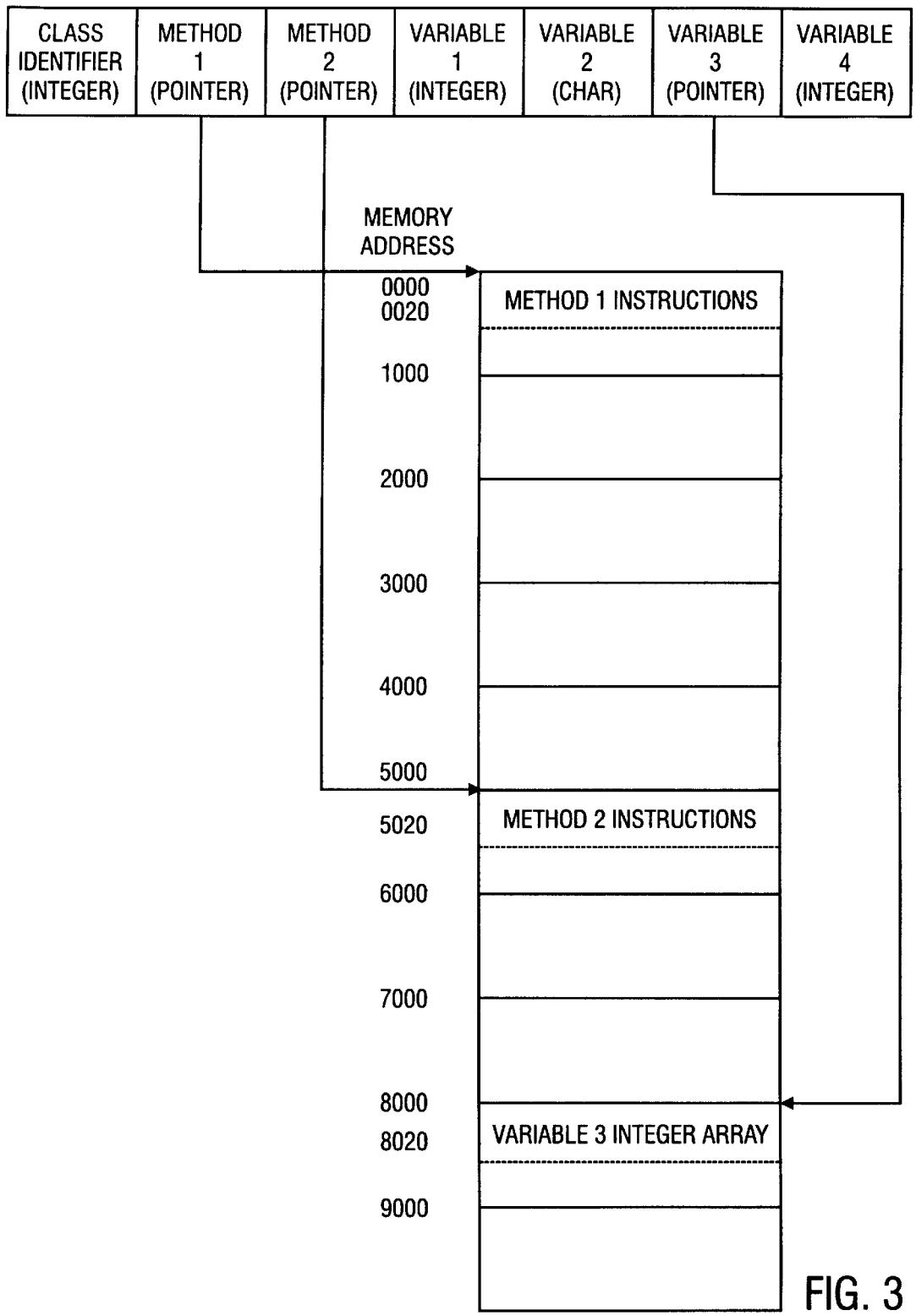
FIG. 3 is a representation of the data structure of an object and its associated methods and variables before serialization.
Figure 4:
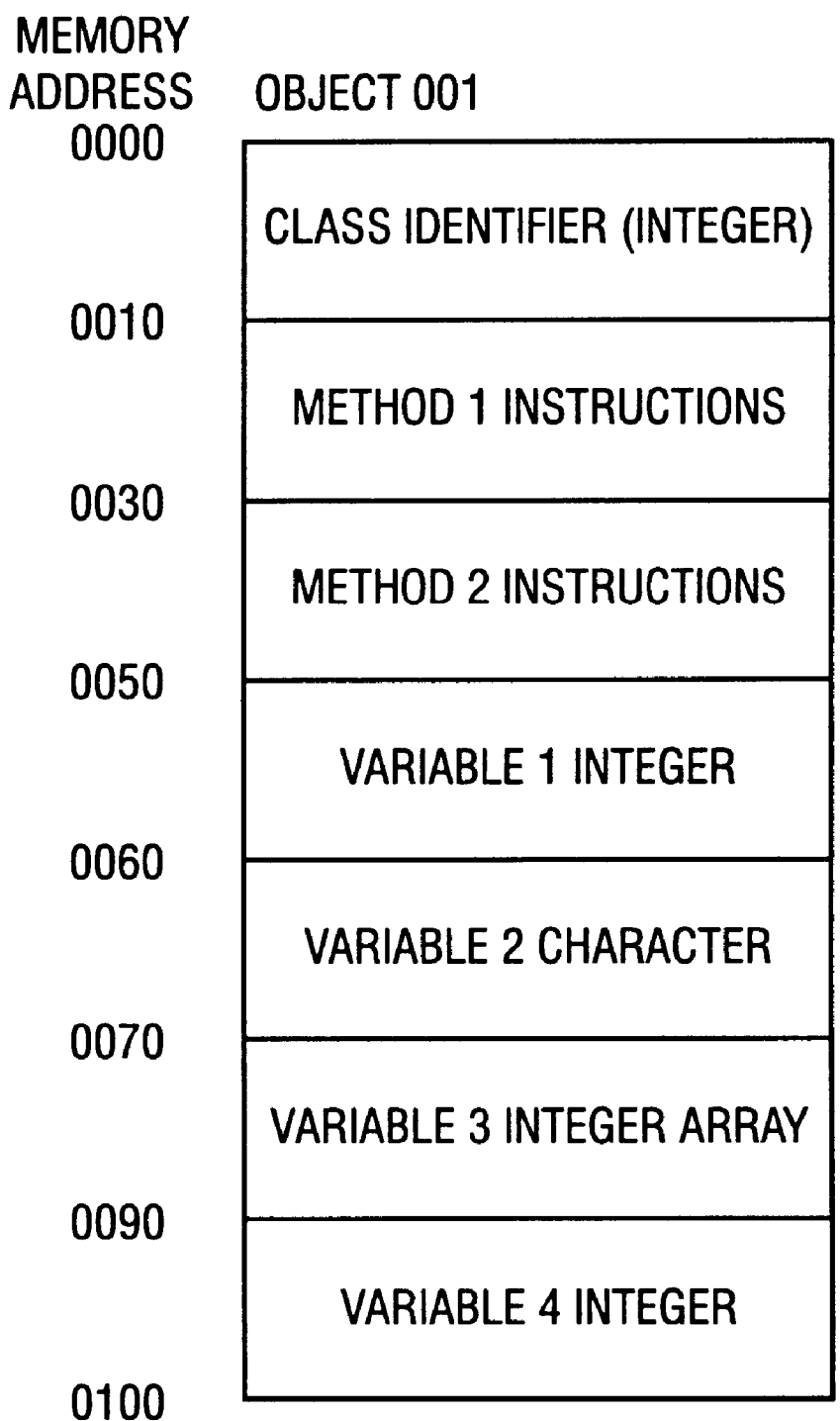
FIG. 4 is a representation of the object in FIG. 3 after serialization.
Figure 5:
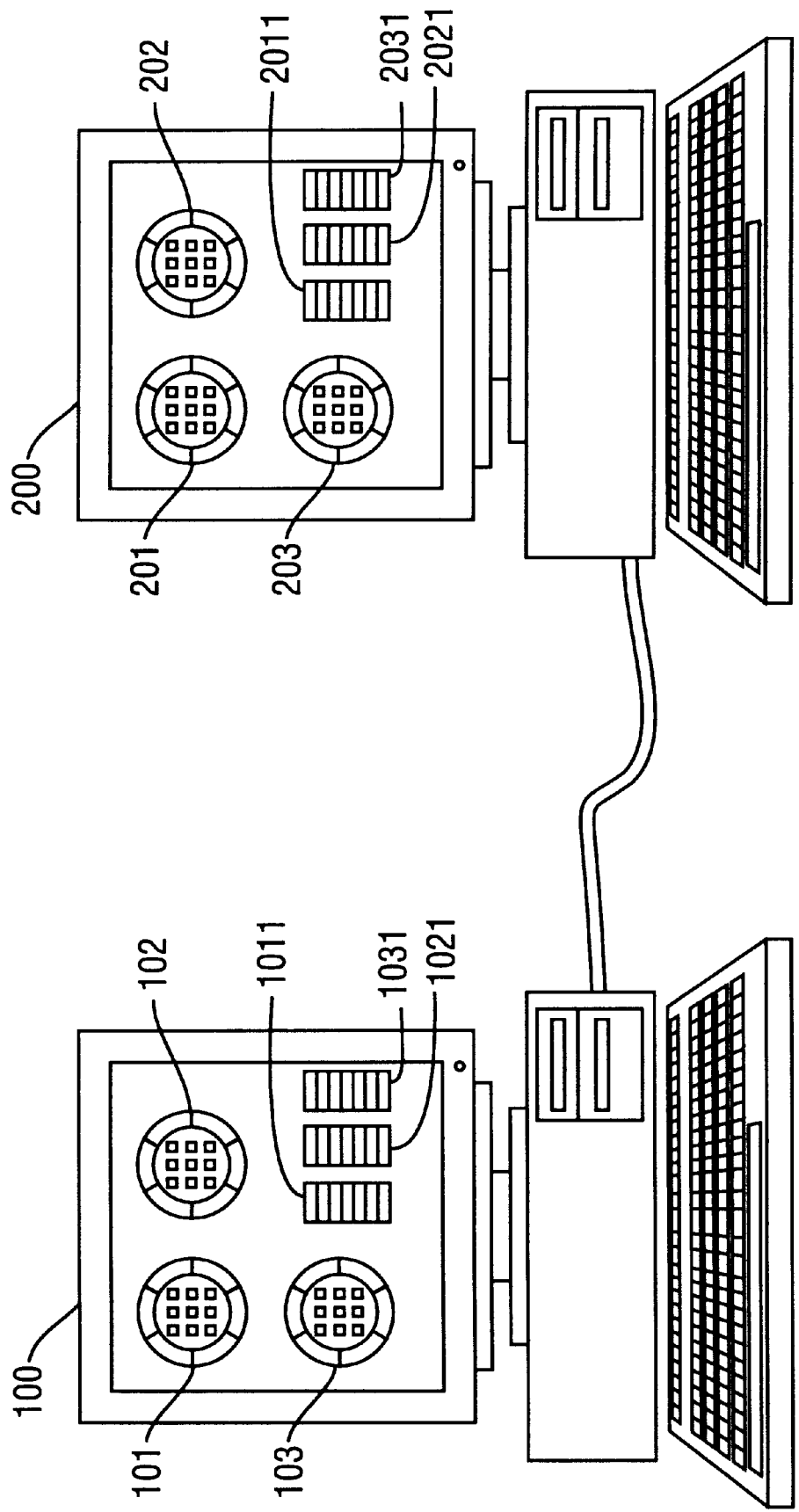
FIG. 5 is a representation of inter-process communication and the need for dynamic object construction.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 6:
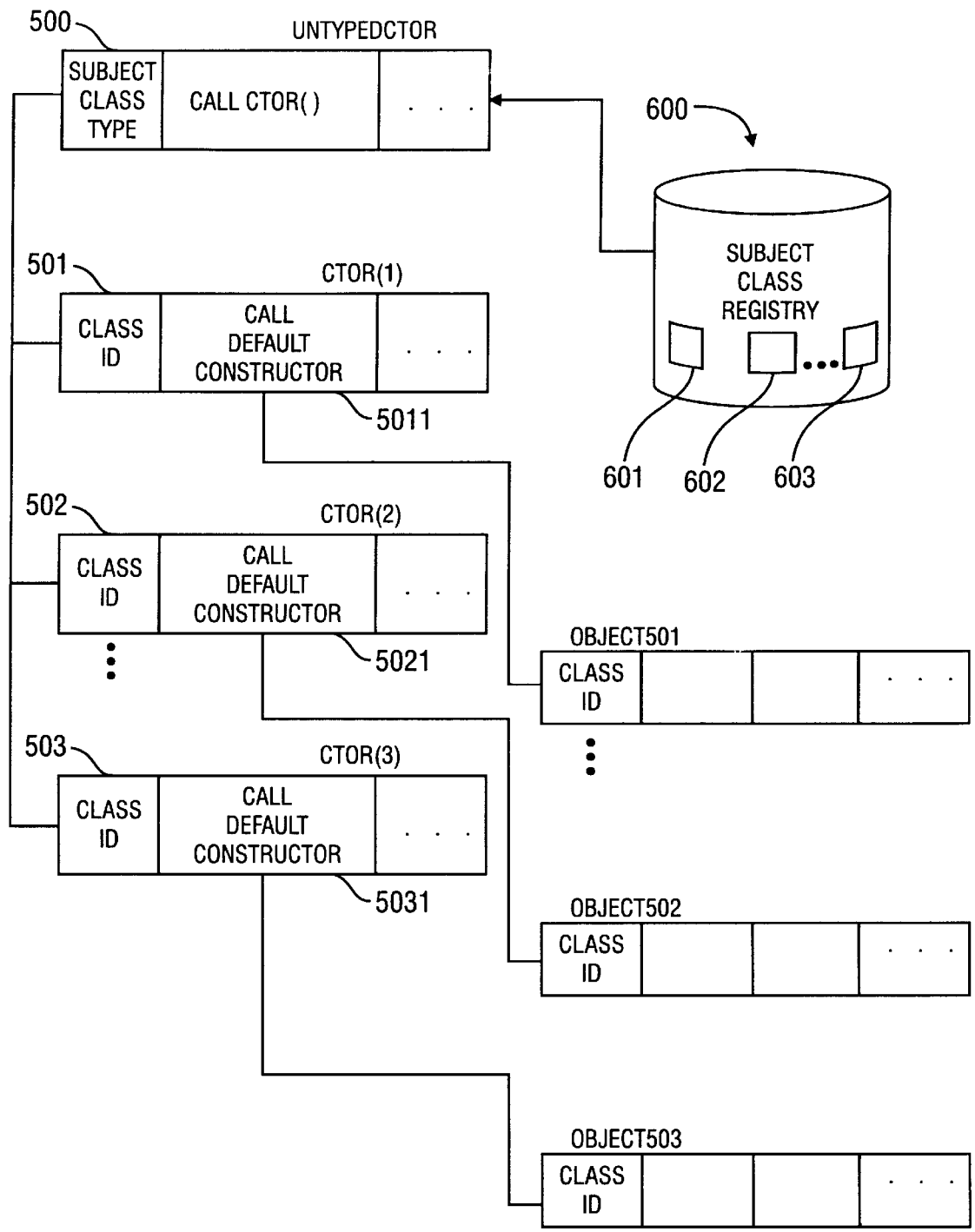
FIG. 6 is a representation of one embodiment of the invention.

In one particular embodiment of the present invention illustrated in FIG. 6, there is defined a utility constructor class template 500 parameterized on the subject class type, and which instantiates a constructor object 501, 502, . . . 503 for each subject class registered in the subject class registry 600. In some alternative embodiments, each constructor object may also be a constructor class. This utility constructor class template 500 is essentially a base class for each constructor object. For each registered subject class 601, 602, . . . 603 there is a corresponding constructor object or constructor class 501, 502, . . . 503. And each constructor object or constructor class 501, 502, . . . 503 provides identical construction semantics for its respective subject class, thus allowing support for any class that implements a default constructor. It is the default constructor 5011, 5021, . . . 5031 that enables each subject class to construct a default object OBJECT 501, OBJECT 502, . . . OBJECT 503 of the subject class type.

The following exemplary code fragment specifies characteristics of the constructor class. In the code fragment below, the class UntypedCtor is a base class from which each constructor class (denominated Ctor) is derived. The base class UntypedCtor has one member function which is to call the appropriate constructor class ("Ctor") based on the subject class identifier provided to the base class UntypedCtor as shown in FIG. 6. The appropriate constructor class ("Ctor") is then responsible for calling the appropriate default constructor to instantiate an object of the subject class type. Thus, all classes to be constructed must be registered with an object factory (or subject class registry) to which the class UntypedCtor has access in order to call the appropriate constructor class.

```
class UntypedCtor
{
public:
    virtual void construct(void**ppvNew) const {*ppvNew = NULL;}
    int operator==(const UntypedCtor&rval) {return ! memcmp(this,&rval,
      sizeof
};
template <class Type> class Ctor: public UntypedCtor
{
public:
    void construct(void**ppvNew) const {*ppvNew = new Type; }
};
```

One embodiment of the present invention uses a data structure that associates a particular subject class identifier with the constructor object for that subject class. The reference implementation uses a Standard Template Library ("STL") map template, but any equivalent technique may be employed.

One particular embodiment of the present invention performs dynamic object construction, which process places minimal constraints on semantics of subject classes. The invention described herein makes minimal semantic requirements of classes to be constructed, and thus eliminates the constraints placed by the alternatives listed above, thus achieving an increased level of "genericness." Specifically, the dynamic object construction method described herein requires no common base class, does not require subject classes to implement non-standard methods, allows the programmer to define the data type of the class identifier, allows the coexistence of multiple object factories (whether of similar or dissimilar class identifier type), allows subject classes to be introduced and discontinued at run-time, and is designed to operate with existing class libraries.

The dynamic object construction process described herein requires no common base classes. Subject classes may have an arbitrary ancestry. While it is likely in practice that subject classes will derive from a common base class with at least one virtual method so that the program can do something useful with the new objects, the practice of the invention described herein is not so limited.

Subject classes according to one embodiment of the invention need implement only the standard C++ default constructor method shown as 5011, 5021, . . . 5031 in FIG. 6 (a standardized method by which objects may be constructed without providing the method (constructor) with any parameters). This is a minimal requirement since the default constructor is very likely to be defined by any general-purpose class, and can, for many classes, be generated by the compiler. All three of the alternatives mentioned above have this same requirement. There are, of course, uses for subject classes lacking a common base class, in which the desired end is wholly accomplished by calling the default constructor. For instance, a process which generated errors might record them remotely by transmitting the error codes to a logger which used the dynamic object construction method of the invention described herein (with the error code type as the class identifier) to construct error objects in which the default constructor wrote time-of-arrival and an error-specific message to a log file.

Another aspect of the invention allows the programmer to define the data type of the class identifier. The class identifier may be of any data type which supports equality comparison semantics. This includes all built-in C++ data types, as well as any user-defined types that explicitly define the comparison operator ("==") or for which the compiler can generate the comparison operation. Because the class identifier types of the alternatives mentioned above meet this minimal requirement, the present invention supports these existing class identification schemes (that is, it is backward compatible).

As mentioned before, inter-process communication and object persistence are fundamental techniques with many applications. Inter-process Communication software written in C++ can employ the present invention to reconstruct serialized objects transmitted over a communications medium. Since protocol standards such as those produced by the Internet Engineering Task Force ("IETF") and International Telecommunications Union ("ITU") are not written in terms of proprietary serialization techniques like those mentioned earlier, these techniques are generally not useful for implementing standard protocols. Lacking the basic capability to convert received protocol data units into C++ objects, software engineers must either design a custom solution, or revert to non-object-oriented techniques.

In another embodiment of the invention, using the Real-Time Protocol ("RTP") standard from the IETF, a class is defined for each RTP and RTCP (control) packet type, deriving from a class hierarchy similar to the following:

```
RTP_Base_Packet
|
+- -RTP_Packet
|
+- -RTCP_Packet
    |
    +- -RTCP_SR_Packet
    +- -RTCP_RR_Packet
    +- -RTCP_SDES_Packet
    +- -RTCP_BYE_Packet
    +- -RTCP_APP_Packet
```

RTP_Base_Packet defines virtual methods for operations common to all packets (serialize, send, deserialize, receive, etc.). RTP_Packet adds methods pertinent to RTP media samples, while RTCP_Packet adds methods specific to control packets. By using the process of the present invention to associate the message identifier with the appropriate class, the program could then convert the User Datagram Protocol ("UDP") datagrams, containing RTP packets to the appropriate C++ objects.

In still another embodiment of the invention, using a compiler-supported run-time type system, such as Microsoft's run-time-type-identification ("RTTI"), the class identifier may be defined to be the class name string type ("const char*") returned by the run-time type system. This eliminates the need to assign class identifiers. In such an embodiment, the class identifier is the name of the class, and the compiler will supply a name string that is fully qualified and guaranteed to be unique in the program.

Unlike alternatives which force the existence of a single global factory object like those described above, the design of the present invention allows for the concurrent existence of multiple factory instances. This capability enables a program to support multiple class identification systems, and to define multiple distinct sets of classes.

For instance, in another embodiment of the invention, a network management program which gathered network status using multiple management protocol standards, each employing a different class identification system (e.g., Simple Network Management Protocol ("SNMP") and Common Management Informational Protocol ("CMIP")), could use the present invention to construct objects appropriate to each protocol. The alternative processes mentioned above would require that the program perform a mapping from the dissimilar class identifier types inherent in the various protocols to some common internal class identifier system.

In still a further embodiment, a language parsing program can employ the present invention to define the sets of objects that could legally be constructed in various semantic contexts, with the class identifier type dependent on the context. The present invention also allows the program to change the set of registered class identifiers at run-time. This facilitates uses in which support for various classes is conditional.

Virtual object construction is the ability to construct a new object of the same arbitrary type (or class) as another existing object. The C++ language does not provide this capability, but in yet another embodiment of the present invention, a program can perform virtual object construction. For this application, the object to be "cloned" must provide a standard copy constructor and a virtual method for finding its class identifier. By using a compiler-supported run-time type system such as Microsoft's run-time-type-identification ("RTTI"), the program could use the class name string as the class identifier, eliminating the requirement of a virtual method. For new classes, a more direct process would be to define a virtual method (e.g., clone) that was implemented in the base class and thus each derived class:

```
class base {
public:
base*clone( ) const {return new base; }
};
class derived1 : public base {
public:
base*clone( )const {return new derived1; }
};
class derived2 : public base {
public:
base*clone( ) const {return new derived2;}
};
```

However, the present invention enables the implementation of virtual object construction for classes not designed to provide that capability.

The particular embodiments disclosed above are illustrative only, as the invention may be modified and practiced in different but equivalent manners apparent to those skilled in the art having the benefit of the teachings herein. For instance, the flexible process for constructing, at run time, objects of arbitrary class, may be used with almost any pre-existing class hierarchy, thus increasing opportunities for code reuse. Also, the process described above may be performed by instructions encoded on some type of program storage device executed by a computer. Exemplary program storage devices include, but are not limited to, read only memory ("ROM") devices, such as optical disks, and random access memory ("RAM") devices, such as a hard disk.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A process for dynamically constructing an object, the process comprising:

providing a utility constructor class parameterized on a subject class type;

providing an object constructor class for a subject class by instantiating the utility constructor class with the subject class;

providing a default constructor method in said object constructor class for constructing an object of said subject class; and using said default constructor method to construct an object of said subject class.

2. The process of claim 1, further comprising:

providing an object class registry; and registering said subject class in said object class registry.

3. The process of claim 2, wherein using said default constructor method includes using said default constructor method at least twice.

4. The process of claim 2, further comprising using said utility constructor class to use said object constructor class to use said default constructor method to construct an object of said subject class.

5. The process of claim 1, wherein using said default constructor method includes using said default constructor method at least twice.

6. The process of claim 1, further comprising using said utility constructor class to use said object constructor class to use said default constructor process to construct an object of said subject class.

7. A machine-readable medium having stored thereon data representing sequences of instructions, the sequences of instructions which, when executed by a processor, cause the processor to perform the steps of:

providing a utility constructor class parameterized on a subject class type;

providing an object constructor class for a subject class by instantiating the utility constructor class with the subject class;

providing a default constructor method in said object constructor class for constructing an object of said subject class; and using said default constructor method to construct an object of said subject class.

8. The machine-readable medium of claim 7, wherein the sequences of instructions further include one or more instructions which, when executed by the processor, cause the processor to perform the steps of:

providing an object class registry; and registering said subject class in said object class registry.

9. The machine-readable medium of claim 8, wherein the sequences of instructions further include one or more instructions which, when executed by the processor, cause the processor to perform the step of using said default constructor method at least twice.

10. The machine-readable medium of claim 8, wherein the sequences of instructions further include one or more instructions which, when executed by the processor, cause the processor to perform the step of using said utility constructor class to use said object constructor class to use said default constructor method to construct an object of said subject class.

11. The machine-readable medium of claim 7, wherein the sequences of instructions further include one or more instructions which, when executed by the processor, cause the processor to perform the steps of using said default constructor method at least twice.

12. The machine-readable medium of claim 7, wherein the sequences of instructions further include one or more instructions which, when executed by the processor, cause the processor to perform the step of using said utility constructor class to use said object constructor class to use said default constructor method to construct an object of said subject class.

13. A method of dynamically constructing an object, the method comprising the steps of:

defining a utility constructor class template that is parameterized on an arbitrary class type, the utility constructor class template including an object constructor class that has a default constructor method for constructing objects of the arbitrary class type;

registering a new class type that was not specified at compile time with an object factory;

creating an new object constructor class associated with the new class type; and instantiating an object of the new class type by calling the default constructor method of the new object constructor class.

14. The method of claim 13, further comprising the step of identifying an appropriate default constructor method based upon an association between a class identifier and the default constructor.

15. The method of claim 14, wherein the data type of the class identifier is user-defined.

* * * * *

UNITED STATES PATENT AND TRADEMARK OFFICE
CERTIFICATE OF CORRECTION

| | |
|---|---|
| PATENT NO. | : 6,032,152 |
| DATED | : February 29, 2000 |
| INVENTOR(S) | : Pearson |

It is certified that error appears in the above-identified patent and that said Letters Patent is hereby corrected as shown below:

In column 3, at line 34, delete "fools" and insert --Tools--.

Signed and Sealed this

Fifteenth Day of May, 2001

NICHOLAS P. GODICI

*Attest:*

*Attesting Officer*     *Acting Director of the United States Patent and Trademark Office*